UNITED STATES PATENT OFFICE.

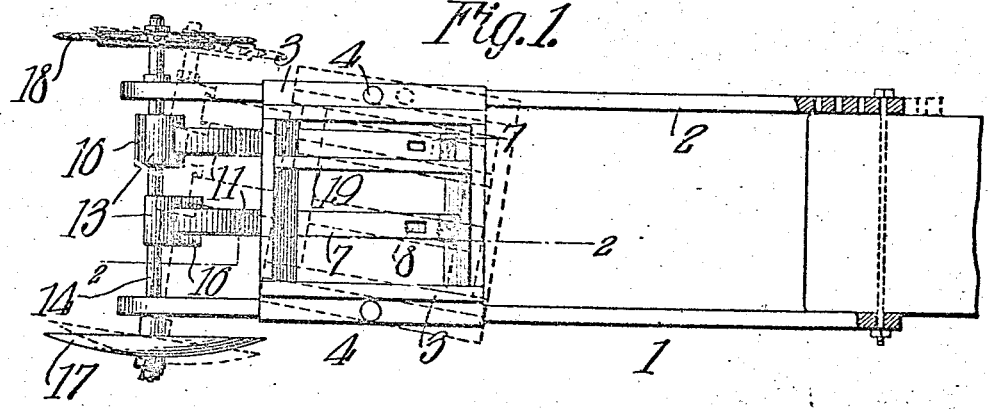

JOHN TUGGLE, OF WATERTOWN, TENNESSEE.

PLANTER AND FERTILIZER-DROPPER.

No. 899,144.　　　Specification of Letters Patent.　　Patented Sept. 22, 1908.

Application filed December 28, 1907. Serial No. 408,442.

*To all whom it may concern:*

Be it known that I, JOHN TUGGLE, a citizen of the United States, residing at Watertown, in the county of Wilson and State of Tennessee, have invented a new and useful Planter and Fertilizer-Dropper, of which the following is a specification.

This invention has relation to planter and fertilizer droppers and it consists in the novel construction and arrangement of its parts as hereinafter shown and described.

The object of the invention is to provide a planter of the character indicated which may be attached to a plow or other furrow opener and which is designed to deposit seed and fertilizer in the furrow and cover the same. The planter consists of two beams one of which is adapted to be adjustably attached to the furrow opener. An axle is journaled for rotation at the rear ends of the beams and a hopper is pivotally mounted at its sides upon the beams. The hopper is provided with spring actuated interchangeable slides which are adapted to separate the material which is ejected from the hopper and means is mounted upon the axle for operating the slides. An earth casting disk is also mounted upon the said axle as is also a traction means which engages the ground and causes the axle to rotate as the planter moves over the surface of the ground.

In the accompanying drawing: Figure 1 is a top plan view of the planter. Fig. 2 is a vertical sectional view of the same cut on the line 2, 2 of Fig. 1, and Fig. 3 is a perspective view of a portion of the axle and the rear ends of the slides.

The planter consists of the beams 1 and 2. The beam 1 is adapted to be attached at its forward end to any convenient part of a plow or furrow opener of usual construction, while the beam 2 is adapted to be adjustably attached to the said plow or furrow opener. The hopper 3 is pivoted at the point 4 to the beams 1 and 2 and rests upon the said beams. Said hopper is provided at its forward side with the outlets 5 under which is located the chute 6. The slides 7 are adapted to move longitudinally along the bottom of the hopper 3 and are provided at intermediate points with openings 8. The said slides project at their ends beyond the front and rear sides of the hopper 3 and are provided at their forward ends with pins 9 which are adapted to engage the front side of the hopper 3 and limit the rearward movement of the said slides. The rear ends of the slides 7 are provided with the hooks 10 the ends of which are forwardly disposed. The flat springs 11 are attached at their upper ends to the upper portion of the rear side of the hopper 3 and are convexly bowed and extend down and are provided at their lower ends with the openings 12 which receive the hooks 10. The springs 11 are under tension with a tendency to maintain the hooks 10 as far as possible away from the rear side of the hopper 3. The pedals 13 are slidably mounted upon the springs 11 and normally lie upon the hooks 10, although the said pedals may be moved up and lodged upon the convex portions of the said springs. The axle 14 is journaled for rotation in the rear ends of the beams 1 and 2 which are provided with elongated openings or bearings 15 for the reception of the said axle. The lugs 16 are attached to the intermediate portion of the axle 14 and are adapted to engage the pedals 13 when in their normal positions. The concaved disk 17 is fixed to one end of the axle 14 while the actiniform traction element 18 is attached to the other end of the axle 14.

It will be observed that as the planter is moved along the surface of the ground the axle 14 will be rotated through the instrumentality of the member 18 which is in engagement with the ground. As the said axle rotates the lugs 16 engage the pedals 13 and move the slide 7 longitudinally against the tension of the springs 11, thus, the openings 8 in the said slides are moved along the bottom of the hopper 3 until they pass over the openings 5. The seed or fertilizer which is contained within the openings 8 falls through the openings 5 into the chute 6 from whence it passes into the furrow which has been opened by the plow to which the planter is attached. When the ends of the lugs 16 pass below the lower ends of the pedals 13 the tension of the springs 11 comes into play and the slides 7 are quickly carried back into their original positions.

It will also be seen that by removing the pins 9 that the slides 7 may be removed from the hopper 3 and other slides having larger or smaller openings 8 may be inserted in their stead. Thus, the hopper may be provided with slides adapted to feed any particular kind of seed or character of fertilizer. The connection between the rear ends of the said slides and the lower ends of the springs 11 is such as to facilitate ready attachment and detachment between the said elements. When it is desired that any one of the slides 7 should remain stationary the pedal 13 mounted upon the spring 11 which is connected with the particular slide 7 is moved up along the spring 11 and is lodged upon the convex portion thereof in the manner as indicated by dotted lines in Fig. 2. Thus, as the said pedal 13 is removed from the path of the lug 16 the said slide 7 will not be moved longitudinally thereby.

It will also be seen that the hopper 3 may be provided with a partition 19 which will divide the said hopper into compartments for holding different kinds of seed or seed and fertilizer and that the parts may be so arranged as to drop different kinds of seed simultaneously or seed and fertilizer simultaneously or at alternate intervals. After the material is deposited in the furrow it is covered by earth which is cast laterally by the concaved disk 17 as it rotates. Provision is made for varying the angle of inclination of the disk 17 with relation to the line of draft in order that the said disk may cast a great or small amount of earth as desired. This is accomplished by providing an adjustable attachment for the beam 2 with the furrow opener so that the said beam 2 may be moved longitudinally with relation to the beam 1. Thus, the axle 14 may be swung from a position at a right angle to the line of draft into a position at an acute angle to the same and the disk 17 will be moved correspondingly. When the beam 2 is moved longitudinally with relation to the beam 1 the hopper 3 will turn upon the pivots 4 so that the parts of the hopper will be operated in the manner above described irrespective of the relative positions of the said beams. By adjusting the seed covering disk the seed may be covered with more or less earth as desired or conditions may require.

Having described my invention, what I claim as new and desire to secure by Letters-Patent is:

1. A planter having a dropping mechanism, an axle journaled for rotation and carrying means for operating the dropping mechanism, a side delivery earth casting disk mounted upon the axle and a traction means also mounted upon the axle.

2. A planter having a dropping mechanism, an axle journaled for rotation and carrying means for operating the dropping mechanism, means for varying the angle of the axle with relation to the line of draft, a side delivery earth casting disk mounted upon the axle and a traction means also mounted upon the axle.

3. A planter comprising a hopper having means for attachment with a furrow opener, a dropping mechanism carried by the hopper, a spring engaging the dropping mechanism, a pedal slidably mounted upon said spring, a rotating means engaging said pedal and a coverer carried by the planter.

4. In combination with a hopper a slide mounted for longitudinal movement therein, a hook mounted upon said slide, a spring attached to the hopper and having an opening which receives said hook, means for moving the slide against the tension of the spring and a detachable means for limiting the movement of the slide in the line of movement of the spring.

In testimony that I claim the foregoing as my own, I have hereto affixed my signature in the presence of two witnesses.

JOHN TUGGLE.

Witnesses:
G. D. HICKS,
T. W. JONES